United States Patent
Laroche et al.

(10) Patent No.: US 10,939,117 B2
(45) Date of Patent: Mar. 2, 2021

(54) SAMPLE SETS AND NEW DOWN-SAMPLING SCHEMES FOR LINEAR COMPONENT SAMPLE PREDICTION

(71) Applicant: CANON KABUSHIKI KAISHA, Tokyo (JP)

(72) Inventors: Guillaume Laroche, Saint Aubin d'Aubigne (FR); Christophe Gisquet, Acigne (FR); Patrice Onno, Rennes (FR); Jonathan Taquet, Talensac (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/645,432

(22) PCT Filed: Sep. 28, 2018

(86) PCT No.: PCT/EP2018/076460
§ 371 (c)(1),
(2) Date: Mar. 6, 2020

(87) PCT Pub. No.: WO2019/072595
PCT Pub. Date: Apr. 18, 2019

(65) Prior Publication Data
US 2020/0288135 A1    Sep. 10, 2020

(30) Foreign Application Priority Data

Oct. 9, 2017  (GB) ..................... 1716538

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS 10,484,712 B2 * 11/2019 Zhang .................. H04N 19/159
2016/0277762 A1 * 9/2016 Zhang .................. H04N 19/167
(Continued)

FOREIGN PATENT DOCUMENTS

| WO | 2014/154094 A1 | 10/2014 | |
| WO | WO 2017/059926 A1 * | 4/2017 | ............ H04N 19/19 |
| WO | 2017/139937 A1 | 8/2017 | |

OTHER PUBLICATIONS

Zhang et al., "Enhanced Cross-Component Linear Model for Chroma Intra-Prediction in Video Coding," IEEE Trans. on Image Processing, vol. 27, No. 8, Aug. 2018 (Year: 2018).*
(Continued)

*Primary Examiner* — Reza Aghevli
(74) *Attorney, Agent, or Firm* — Canon U.S.A., Inc. IP Division

(57) ABSTRACT

The disclosure regards cross-component prediction and methods for obtaining a chroma sample from an associated luma sample using a linear model with parameters. The parameters are derived from luma and chroma samples neighbouring the luma and chroma blocks considered. The luma samples are down-sampled to match chroma resolution. A competition between several luma down-sampling schemes is proposed wherein two 1-tap filters are competing. This reduces computational complexity at the encoder. Also a competition between several sample sets defining the neighbouring luma and chroma samples used for parameter derivation is conducted, wherein a competing sample set is an irregular sample set. The irregular sample set preferably comprises only samples from second lines next to respective first lines of outer neighbouring samples parallel and imme- (Continued)

diately adjacent to respectively the left boundary and the top boundary of the current block. This improves chroma prediction and thus coding efficiency.

23 Claims, 9 Drawing Sheets

(51) Int. Cl.
*H04N 19/176* (2014.01)
*H04N 19/186* (2014.01)
*H04N 19/46* (2014.01)

(56) References Cited

U.S. PATENT DOCUMENTS

| | | | | |
|---|---|---|---|---|
| 2017/0359595 | A1* | 12/2017 | Zhang | H04N 19/593 |
| 2018/0146211 | A1* | 5/2018 | Zhang | H04N 19/159 |
| 2018/0176594 | A1* | 6/2018 | Zhang | H04N 19/11 |
| 2018/0220130 | A1* | 8/2018 | Zhang | H04N 19/159 |
| 2018/0262763 | A1* | 9/2018 | Seregin | H04N 19/619 |
| 2020/0177911 | A1* | 6/2020 | Aono | H04N 19/139 |
| 2020/0204799 | A1* | 6/2020 | Lee | G06T 9/00 |
| 2020/0244956 | A1* | 7/2020 | Lee | H04N 19/186 |
| 2020/0260096 | A1* | 8/2020 | Ikai | H04N 19/46 |
| 2020/0296380 | A1* | 9/2020 | Aono | H04N 19/70 |

OTHER PUBLICATIONS

Kim et al., "Cross-Component Prediction in HEVC," IEEE Trans. on Circuits and Systems for Video Technology, vol. 30, No. 6, Jun. 2020 (Year: 2020).*

Shohei Matsuo et al, "Extension of Intra Prediction Using Multiple Reference Lines", 32. VCEG Meeting; 80. MPEG Meeting; Apr. 23, 2007-Apr. 27, 2007; San Jose;(Video Coding Experts Group of ITU-T SG.16),,No. VCEG-AF05, Apr. 19, 2007 (Apr. 19, 2007).

Yao Q et al, "Reference Line Generation for Intra Prediction", 4. JVET Meeting; Oct. 15, 2016-Oct. 21, 2016; Chengdu; (The Joint Video Exploration Team of ISO/IEC JTC1/SC29/WG11 and ITU-T SG.16 );,No. JVET-D0045, Oct. 5, 2016 (Oct. 5, 2016).

Zhang K et al, "EE5: Enhanced Cross-component Linear Model Intra-prediction", 5. JVET Meeting; Jan. 12, 2017-Jan. 20, 2017; Geneva; (The Joint Video Exploration Team of ISO/IEC JTC1/SC29/WG11 and ITU-T SG.16 ); ,No. JVET-E0077, Jan. 4, 2017 (Jan. 4, 2017.

* cited by examiner

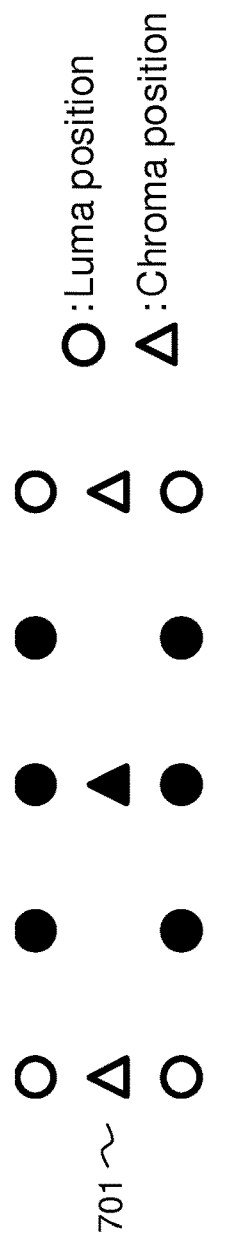
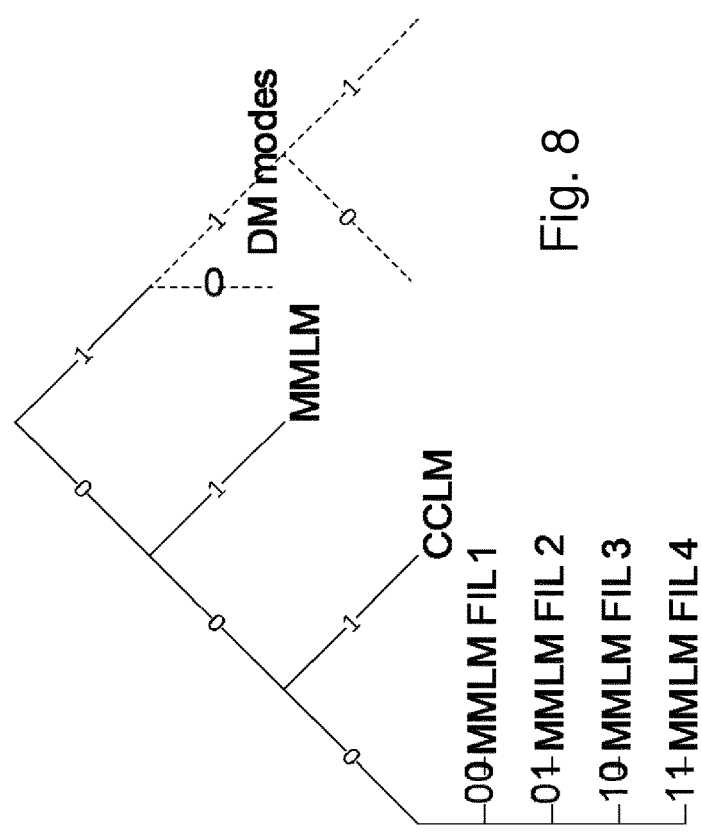
Fig. 7
Fig. 8

SAMPLE SETS AND NEW DOWN-SAMPLING SCHEMES FOR LINEAR COMPONENT SAMPLE PREDICTION

CROSS-REFERENCE TO RELATED APPLICATIONS

This application is the National Phase application of PCT Application No. PCT/EP2018/076460, filed on Sep. 28, 2018 and titled "NEW SAMPLE SETS AND NEW DOWN-SAMPLING SCHEMES FOR LINEAR COMPONENT SAMPLE PREDICTION". This application claims the benefit under 35 U.S.C. 119(a)-(d) of United Kingdom Patent Application No. 1716538.2, filed on Oct. 9, 2017 and titled "NEW SAMPLE SETS AND NEW DOWN-SAMPLING SCHEMES FOR LINEAR COMPONENT SAMPLE PREDICTION". The above cited patent applications are hereby incorporated by reference herein in their entireties.

DOMAIN OF THE INVENTION

The present invention regards the encoding or decoding of colour component blocks, in particular the intra prediction of such colour component blocks or the obtained of the samples of such blocks. The invention finds applications in the obtaining of chroma blocks of video data from luma samples.

BACKGROUND OF THE INVENTION

Predictive encoding of video data is based on the division of frames into blocks of pixels. For each block of pixels, a predictor block is searched in available data. The predictor block may be a block in a reference frame different from the current one in INTER coding modes, or generated from neighbouring pixel in the current frame in INTRA coding modes. Different encoding modes are defined according to different way of determining the predictor block. The result of the encoding is an indication of the predictor block and a residual block consisting in the difference between the block to be encoded and the predictor block.

Regarding INTRA coding modes, various modes are usually proposed, such as a DC mode, a planar mode and angular modes. Each of them intends to predict samples of a block using previously decoded boundary samples from spatially neighbouring blocks.

The encoding may be performed for each colour component forming the pixels of the video data. Although RGB (for Red-Green-Blue) representation is well-known, the YUV representation is preferably used for the encoding to reduce the inter-channel redundancy.

However, inter-channel correlation is still observed locally.

To take advantage of it and improve compression efficiency, the usage of Cross-Component Prediction (CCP) has been studied in the state of this art. The main application of CCP regards luma-to-chroma prediction. It means that the luma samples have already been encoded, using conventional techniques, and reconstructed from encoded data (as the decoder does). However, variants use CCP for chroma-to-chroma prediction or more generally for first-colour-component to second-colour-component prediction (including RGB).

The Cross-Component Prediction may apply directly on a block of chroma pixels or may apply on a residual chroma block (meaning the difference of a chroma block with a chroma block predictor).

LM mode uses a linear model to predict chroma from luma as a chroma intra prediction mode, relying on one or two parameters, slope ($\alpha$) and offset ($\beta$), to be determined. The chroma intra predictor is thus derived from reconstructed luma samples of a current luma block using the linear model with the parameters.

The linearity, i.e. parameters $\alpha$ and $\beta$, is derived from the reconstructed causal samples, in particular from a neighbouring chroma sample set comprising reconstructed chroma samples neighbouring the current chroma block to predict and from a neighbouring luma sample set comprising luma samples neighbouring the current luma block.

Specifically, for a N×N chroma block, the above N neighbours and the left N neighbours are used to form the neighbouring chroma sample set for derivation.

The neighbouring luma sample set is also made of N neighbouring samples just above the corresponding luma block and N neighbouring samples on the left side of the luma block.

It is known to reduce the size of the video data to encode without significant degradation of visual rendering, by subsampling the chroma components. Known subsampling modes are labelled 4:1:1, 4:2:2, 4:2:0.

In the situation where the video data are chroma-subsampled, the luma block corresponding to the N×N chroma block is bigger than N×N. In that case, the neighbouring luma sample set comprises 2N reconstructed luma samples neighbouring the current luma block that are down-sampled to match chroma resolution. Also, the chroma intra predictor to predict the chroma samples in the current N×N chroma block has to be generated using the linear model with the one or more parameters $\alpha$ and $\beta$ derived and the reconstructed luma samples of the current luma block that are also down-sampled to match chroma resolution. The down-sampling of the reconstructed luma samples at chroma resolution makes it possible to retrieve the same number of samples as the chroma samples to form both the luma sample set and the chroma intra predictor.

The chroma intra predictor is thus subtracted from the current chroma block to obtain a residual chroma block that is encoded at the encoder. Conversely at the decoder, the chroma intra predictor is added to the received residual chroma block in order to retrieve the chroma block.

Sometimes, the residual chroma block is negligible and thus not kept (not encoded). In that case the above-mentioned chroma intra predictor is used as the chroma block itself. As a consequence, the above LM mode makes it possible to obtain a chroma (or any first colour component) sample for a current chroma block from an associated (i.e. collocated or corresponding) reconstructed luma (or any second colour component) sample of a current luma block in the same frame using a linear model with one or more parameters, wherein the chroma sample is obtained using the linear model with the one or more parameters derived and the associated reconstructed luma samples in the current luma block made of reconstructed luma samples down-sampled to match chroma resolution.

The Joint Exploration Model (JEM) of the Joint Video Exploration Team (JVET) adds six Cross-Component (luma-to-chroma) linear model modes to the conventional intra prediction modes already known. All these modes compete one against the other to predict or generate the chroma blocks, the selection being usually made based on a rate-distortion criterion.

The six Cross-Component (luma-to-chroma) linear model modes differ one from the other by different down-sampling schemes used to down-sample the reconstructed luma samples and/or by different sample sets of samples from which the parameters α and β are derived.

For instance, the sample sets may be made of the two lines (i.e. rows and columns) of samples neighbouring the current luma or chroma block, which two lines are parallel and immediately adjacent to each one of the top and/or left boundaries of the current luma or chroma block at chroma resolution. Such exemplary sample set is described in publication U.S. Pat. No. 9,736,487.

Other exemplar sample sets are also disclosed in publications U.S. Pat. Nos. 9,288,500 and 9,462,273.

The down-sampling schemes used in JEM include a 6-tap filter determining a down-sampled reconstructed luma sample from six reconstructed luma samples but also three 2-tap filters that select either the top right and bottom right samples from among the six reconstructed luma samples, or the bottom and bottom right samples, or the top and top right samples, and a 4-tap filter that selects the top, top right, bottom and bottom right samples of the six reconstructed luma samples.

SUMMARY OF THE INVENTION

The JEM is complex in term of processing. For instance, it requires several down-sampling filters to be evaluated, each of them requiring computations. It is thus sought to improve coding efficiency without increasing the JEM complexity.

The present invention has been devised to address one or more of the foregoing concerns. It concerns an improved method for obtaining a chroma sample for a current chroma block, possibly through chroma intra prediction.

As introduced above, a method of obtaining a chroma sample for a current chroma block (which means a block of chroma components or a residual chroma block already obtained from a first prediction) from an associated reconstructed luma sample of a current luma block in the same frame (either a luma component block of a residual luma block) using a linear model with one or more parameters, comprises:

deriving the one or more parameters of the linear model based on a neighbouring chroma sample set comprising chroma samples neighbouring the current chroma block and a neighbouring luma sample set, the neighbouring luma sample set comprises reconstructed luma samples neighbouring the current luma block that are down-sampled to match chroma resolution, and obtaining the chroma sample using the linear model with the one or more parameters derived and the associated reconstructed luma samples in the current luma block made of reconstructed luma samples down-sampled to match chroma resolution.

To reduce processing complexity of such method, the present invention provides that down-sampling reconstructed luma samples (either the samples of the current luma block itself during the obtaining step or the samples neighbouring the current luma block during the deriving step) to match chroma resolution includes obtaining one from a plurality of reference down-sampling schemes (for instance selecting one of competing schemes based on a rate-distortion criterion at the encoder, whereas an indication in the bitstream makes it possible for the decoder to know which scheme to use), which plurality comprises at least two subsampling 1-tap filters that each selects, as down-sampled reconstructed luma sample at a down-sampling position, one different reconstructed luma sample in the vicinity of the down-sampling position.

Tap filters are also known as finite impulse response (FIR) filters. A FIR filter of order N provides an output value equal to a weighted sum of N input values.

The inventor has surprisingly noticed that the coding efficiency is not reduced but kept stable, although 1-tap filters (which correspond to subsampling) are used. One possible reason for such technical result may be that the 1-tap filters provide more variability between the parameters α and β generated by the reference schemes compared to the conventional n-tap filters used (with n>1). As a result, some chroma blocks are better predicted or obtained.

However, the main benefits of this approach are a substantial reduction of complexity because the proposed 1-tap filters amount to only select a single sample without performing weighted computations as done for conventional 2-tap or 6-tap filters proposed in JEM.

More generally, such a method is a method of obtaining a chroma sample for a chroma block based on a luma sample of an associated luma block in the same frame using a linear model, the method comprising:

down-sampling luma samples of the associated luma block to match a resolution of the chroma block (chroma resolution), deriving one or more parameters for the linear model based on a neighbouring chroma sample set comprising chroma samples of positions neighbouring the chroma block, and a neighbouring luma sample set, the neighbouring luma sample set comprising down-sampled luma samples of luma samples neighbouring the current luma block; and obtaining the chroma sample using the linear model with the one or more derived parameters and the down-sampled luma samples of the associated luma block, wherein down-sampling comprises selecting a process in which a luma sample from neighbouring luma samples having different positions neighbouring the down-sampled position is used as a down-sampled luma sample.

One may thus understand that the process can select a 1-tap filter as introduced above from a plurality of reference sampling schemes.

The invention also provides a corresponding device comprising at least one microprocessor configured for carrying out the same steps as the method.

Optional features of embodiments of the invention are defined in the appended claims. Some of these features are explained here below with reference to a method, while they can be transposed into system features dedicated to the device.

In embodiments, any subsampling 1-tap filter in the reference down-sampling schemes selects one from top, top right, bottom and bottom right samples of six reconstructed luma samples surrounding the down-sampling position. The 1-tap filters are thus limited to filters selecting the rightmost samples from the six conventionally-used samples. The inventor has noticed these four samples provide, on average, better chroma samples from the luma samples.

In an embodiment, the reference down-sampling schemes include four subsampling filters selecting, respectively, top, top right, bottom and bottom right samples of six reconstructed luma samples surrounding the down-sampling position. Again, better chroma samples are obtained from the luma samples, because the four most relevant samples are always evaluated during a competition between the reference schemes at the encoder.

In embodiments, the reference down-sampling schemes include a n-tap filter determining a down-sampled reconstructed luma sample from n reconstructed luma samples in the vicinity of the down-sampling position, n≥2. For instance, the reference down-sampling schemes include a 6-tap filter determining a down-sampled reconstructed luma sample from top left, top, top right, bottom left, bottom and bottom right samples of six reconstructed luma samples surrounding the down-sampling position.

In some embodiments, the same obtained reference down-sampling scheme is used for all reconstructed luma samples neighbouring the current luma block to obtain the reconstructed neighbouring luma sample set. Accordingly, the invention applies 1-tap filters to the neighbouring samples used to derive the LM parameters. It results that more accurate parameters are obtained for the linear model.

In embodiments which may be combined with the previous ones, the same obtained reference down-sampling scheme is used to down-sample the reconstructed luma samples of the current luma block to chroma resolution before using the linear model with the one or more parameters derived to obtain the chroma sample. Accordingly, the invention applies 1-tap filters to actually generate the chroma sample, for instance through a chroma intra predictor. The obtained chroma sample appears, on average, to be more accurate at the end than in the known techniques.

To improve coding efficiency, the present invention also provides another method. The method is for obtaining a first-colour-component (e.g. chroma or RGB) sample for a current first-colour-component block of a multi-colour-component (e.g. YUV or RGB) frame, from an associated reconstructed second-colour-component (e.g. chroma, luma or RGB) sample of a current second-colour-component block in the same frame using a linear model with one or more parameters, the two blocks having the same size. Thus the second-colour-component may be obtained through down-sampling of a larger block, an example of which being provided above (down-sampling of a luma block).

The method comprises:

deriving the one or more parameters of the linear model based on a neighbouring first-colour-component sample set comprising first-colour-component samples neighbouring the current first-colour-component block and a neighbouring second-colour-component sample set comprising reconstructed second-colour-component samples neighbouring the current second-colour-component block, and obtaining, using the linear model with the one or more parameters derived, the first-colour-component sample using the linear model with the one or more parameters derived and on the associated reconstructed second-colour-component sample in the current second-colour-component block.

Furthermore, in this method, deriving the one or more parameters includes obtaining one from a plurality of reference sample sets to define the neighbouring first-colour-component and second-colour-component sample sets for the parameter derivation, the plurality of reference sample sets including one or more irregular sample sets (the obtaining can be a competition at the encoder between the reference sample sets made for instance based on a rate-distortion criterion), wherein an irregular sample set is built from two lines of outer neighbouring samples parallel and adjacent to the top boundary of the current block (i.e. either the first or second colour component block) and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

Only the left and top boundaries are considered here because the outer neighbouring samples of the other (right and bottom) boundaries are usually not yet known (decoded) at the decoder when performing the operation.

The inventor has noticed that the use of irregular sample sets as defined above improves coding efficiency. It is assumed that this improvement comes from the fact that the newly proposed sample sets provide more diversity between the LM parameters obtained through the competing modes than between the LM parameters conventionally obtained.

Other embodiments of the invention are directed to a method of obtaining a first-colour-component sample for a current first-colour-component block of a multi-colour-component frame from an associated reconstructed second-colour-component sample of a current second-colour-component block in the same frame using a linear model with one or more parameters, the two blocks having the same size, the method comprising:

deriving the one or more parameters of the linear model based on a neighbouring sample set comprising first-colour-component or second-colour-component samples neighbouring respectively the current first-colour-component or second-colour-component block and obtaining the first-colour-component sample using the linear model with the one or more parameters derived and the associated reconstructed second-colour-component sample, wherein deriving the one or more parameters includes obtaining one from a plurality of reference sample sets, including one or more irregular sample sets, to define the neighbouring first-colour-component or second-colour-component sample set for the parameter derivation, at least one irregular sample set comprising only samples from second lines next to respective first lines of outer neighbouring samples parallel and immediately adjacent to respectively the left boundary and the top boundary of the current block.

More generally, such a method is a method of obtaining a first-colour-component sample for a current first-colour-component block based on an associated second-colour-component sample in the same frame using a linear model with one or more parameters, the method comprising:

deriving the one or more parameters of the linear model based on a neighbouring sample set comprising first-colour-component or second-colour-component samples neighbouring respectively the current first-colour-component or second-colour-component block and obtaining the first-colour-component sample using the linear model with the one or more parameters derived and the associated second-colour-component sample, wherein the step of deriving comprises selecting an irregular neighbouring sample set which selects only samples located above or to the left of the considered second-colour-component block and not immediately adjacent to the block considered.

This irregular neighbouring sample set can belong to a plurality of reference sample sets based on which a competition (at the encoder) may be driven.

The invention also provides corresponding devices, each comprising at least one microprocessor configured for carrying out the same steps as the corresponding method.

Optional features of embodiments of the invention are defined in the appended claims. Some of these features are explained here below with reference to a method, while they can be transposed into system features dedicated to the device.

In some embodiments, at least one sample in the first line is not selected to build one or more of the irregular sample sets. Surprisingly, a sample set which does not use a sample from the first line (i.e. either the column or the row adjacent to the boundary considered) may provide better parameter estimation than the conventional sample sets made from two adjacent lines.

In some embodiments, for each of the top and left boundaries, the two lines are immediately adjacent to the boundary considered.

According to a specific feature, the one or more irregular sample sets includes at least one non-adjacent sample set comprising, along the same top or left boundary (preferably both), samples from the next and second line only. This kind of sample sets without any sample selected from the column or row immediately adjacent to the boundary considered provides more diversity to the conventional sample sets than a widely-used sample set selecting only the column or row immediately adjacent. This increased level of diversity offers better chroma samples, thereby better coding efficiency.

In other embodiments that may be combined with the previous ones, the one or more irregular sample sets includes at least one shifted sample set comprising, for the same position along the top or left boundary (preferably both), at most one from the sample of the first line and the sample of the next and second line. This kind of sample sets also provides more diversity.

According to a specific feature, the shifted sample set comprises exactly one sample from the sample of the first line and the sample of the next and second line, for each position along the top or left boundary (preferably both). In practice, some (e.g. half) may be from the first line while some others (the other half) may be from the second line.

In yet other embodiments that again may be combined with the previous ones, the one or more irregular sample sets includes at least one L-shaped sample set comprising, along the same top or left boundary (preferably both), the samples of the first and second lines for a first position along the boundary and only one sample from the sample of the first line and the sample of the next and second line for a second and different position along the boundary. This kind of sample sets also provides more diversity.

In yet other embodiments that again may be combined with the previous ones, the one or more irregular sample sets includes at least one square sample set comprising the samples of the first and second lines for each position of a continuous subpart of positions along the top or left boundary (preferably both) and comprising, for the remaining subpart or subparts of positions, no sample from the first and second lines. This kind of sample sets also provides more diversity.

In yet other embodiments that again may be combined with the previous ones, one or more of the irregular sample sets comprises the four samples forming a square continuing, at the top left corner of the current block, the two lines adjacent to the top and left boundaries. The four samples may be added to any of the non-adjacent, shifted, L-shaped and square sample sets. The four additional samples provide more diversity.

In some embodiments, one or more of the irregular sample sets comprise a different number of samples from the first line and of samples from the next and second line. This feature increases the irregularity of the sample set shape, thereby increasing the diversity between the competing parameters derived.

In some embodiments, the samples selected along the top boundary for one or more irregular sample sets form a top sample shape that is identical to or mirrored from a left sample shape forming the samples selected along the left boundary.

In other embodiments, one or more of the irregular sample sets are built by selecting some samples from the two lines based on the samples values. For instance, the samples of the two lines having a value in the first or fourth quarters of the range taken by the sample values are selected. The selection can be made from the outer neighbouring luma or chroma samples.

Of course, in some variants, the sample sets may only select samples along the top boundary or along the left boundary, using the above-defined shapes.

The methods above may be of course combined thereby providing a double competition, at down-sampling scheme level and at sample set level. To reduce processing load and signalling bits to signal the schemes and sets used, the invention also provides a method of obtaining a chroma sample for a current chroma block from an associated reconstructed luma sample of a current luma block in the same frame using a linear model with one or more parameters, the method comprising:

deriving the one or more parameters of the linear model based on a neighbouring chroma sample set comprising chroma samples neighbouring the current chroma block and a neighbouring luma sample set, the neighbouring luma sample set comprises reconstructed luma samples neighbouring the current luma block that are down-sampled to match chroma resolution, obtaining the chroma sample using the linear model with the one or more parameters derived and the associated reconstructed luma samples in the current luma block made of reconstructed luma samples down-sampled to match chroma resolution, obtaining one reference LM mode from a plurality of reference LM modes, each of which being made of one down-sampling scheme and one sample set, to down-sample, using the thus-obtained down-sampling scheme, the reconstructed luma samples to match chroma resolution for the parameter derivation and for the chroma intra predictor generation and to define, using the thus-obtained sample set, the neighbouring luma and chroma sample sets for the parameter derivation, wherein at least one reference LM mode includes an irregular sample set built from two lines of outer neighbouring samples parallel and adjacent to the top boundary of the current block and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

The optional features detailed further above for the various methods of the invention may also apply to this method with reference LM modes.

For instance, at least one reference LM mode may include a down-sampling scheme that selects, as down-sampled reconstructed luma sample at a down-sampling position, one reconstructed luma sample in the vicinity of the down-sampling position.

Also, four of the reference LM modes may include four respective down-sampling schemes that select, respectively, top, top right, bottom and bottom right samples of six reconstructed luma samples surrounding the down-sampling position.

According to another optional feature, for each of the top and left boundaries, the two lines may be immediately adjacent to the boundary considered.

Then, the irregular sample set may comprise, along the same top or left boundary, samples from the next and second line only.

In some embodiments, the method may further comprise including in a bitstream encoding the current chroma block (at the encoder) or retrieving from such bitstream (at the decoder), a single flag identifying the obtained reference LM mode.

The invention also provides a corresponding device comprising at least one microprocessor configured for carrying out the same steps as the method.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and node devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 7 illustrates some down-sampling filters known in prior art;

FIG. 8 illustrates an exemplary coding of signalling flags to signal LM modes;

DETAILED DESCRIPTION OF EMBODIMENTS

Figure 1:
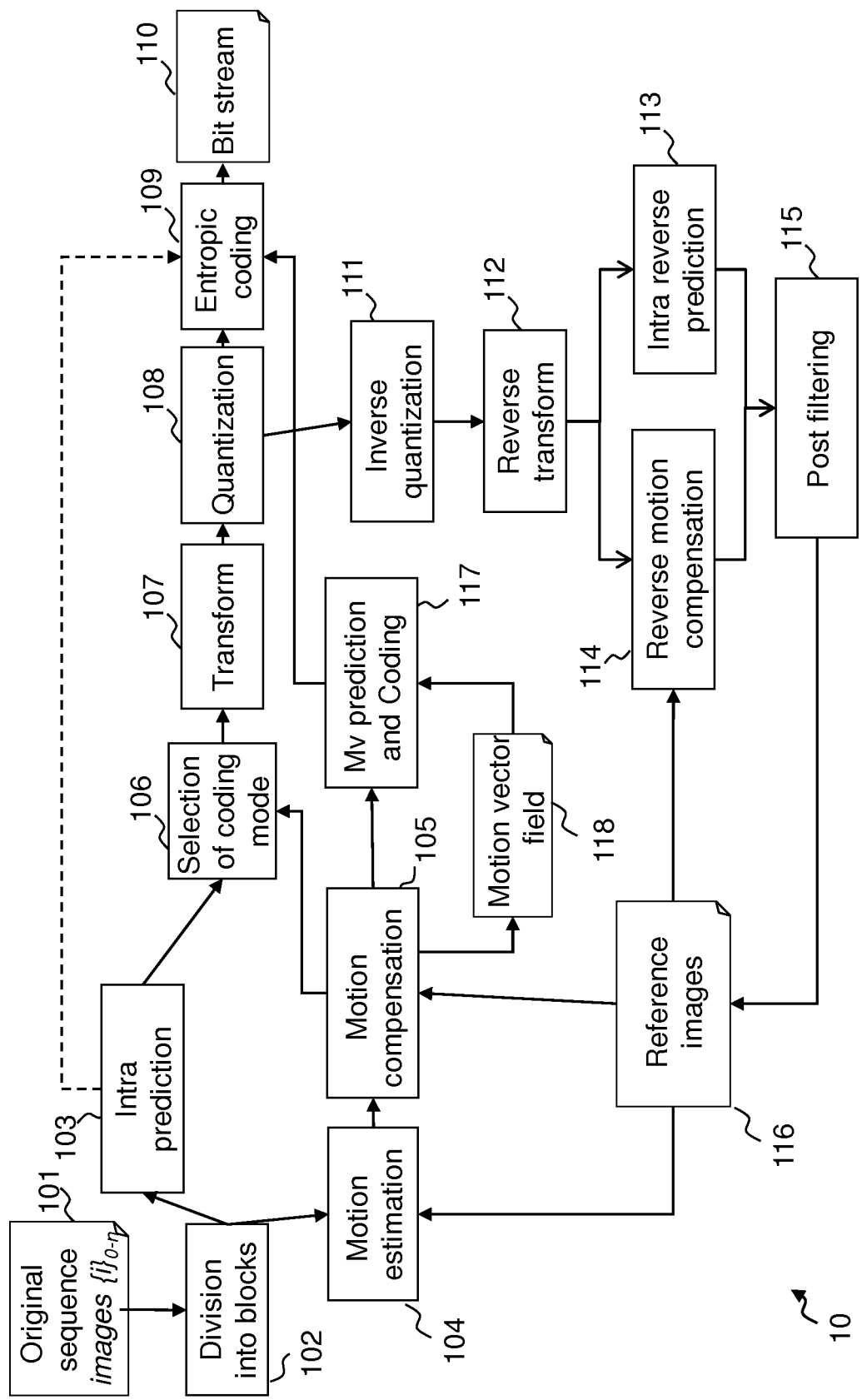
FIG. 1 illustrates the HEVC encoder logical architecture.

FIG. 1 illustrates the HEVC encoder architecture. In the video encoder, an original sequence 101 is divided into blocks of pixels 102 called coding units. A coding mode is then affected to each block. There are two families of coding modes typically used in HEVC: the coding modes based on spatial prediction or "INTRA modes" 103 and the coding modes based on temporal prediction or "INTER modes" based on motion estimation 104 and motion compensation 105.

An INTRA Coding Unit is generally predicted from the encoded pixels at its causal boundary by a process called INTRA prediction. The predictor for each pixel of the INTRA Coding Unit thus forms a predictor block. Depending on which pixels are used to predict the INTRA Coding Unit, various INTRA modes are proposed: DC mode, a planar mode and angular modes.

Temporal prediction first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue or residual block in a motion compensation step 105.

In both cases, spatial and temporal prediction, a residue or residual block is computed by subtracting the obtained predictor block from the Coding Unit.

In the INTRA prediction, a prediction direction is encoded.

In the temporal prediction, an index indicating the reference frame used and a motion vector indicating the reference area in the reference frame are encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector (or motion vector predictor) in its surrounding. In H.264/AVC coding standard for instance, motion vectors are encoded with respect to a median vector computed from the motion vectors associated with three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

The HEVC standard uses three different INTER modes: the Inter mode, the Merge mode and the Merge Skip mode, which mainly differs one from the other by the signalling of the motion vector in the bitstream 110. Regarding motion vector prediction, HEVC provides several candidates of motion vector predictor that are evaluated during a rate-distortion competition in order to find the best motion vector predictor or the best motion information for respectively the Inter or the Merge mode. An index corresponding to the best predictors or the best candidate of the motion information is inserted in the bitstream 110. Thanks to this signalling, the decoder can derive the same set of predictors or candidates and uses the best one according to the decoded index.

The design of the derivation of motion vector predictors and candidates contributed to achieve the best coding efficiency without large impact on complexity. Two motion vector derivations are proposed in HEVC: one for Inter mode (known as Advanced Motion Vector Prediction (AMVP)) and one for the Merge modes (known as Merge derivation process).

Then, the coding mode optimizing a rate-distortion criterion for the Coding Unit currently considered is selected in module 106. In order to further reduce the redundancies within the obtained residue data, a transform, typically a DCT, is applied to the residual block in module 107, and a quantization is applied to the obtained coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames 116. To reconstruct the coded frame, the quantized and transformed residual block is inverse quantized in module 111 and inverse transformed in module 112 in order to provide the "reconstructed" residual block in the pixel domain. Due to the loss of the quantization, this "reconstructed" residual block differs from original residual block obtained at step 106.

Next, according to the coding mode selected at 106 (INTER or INTRA), this "reconstructed" residual block is added to the INTER predictor block 114 or to the INTRA predictor block 113, to obtain a "pre-reconstructed" block (Coding Unit).

Next, this "pre-reconstructed" block is filtered in module 115 by one or several kinds of post filtering to obtain a "reconstructed" block (Coding Unit). The same post filters are integrated at the encoder (in the decoding loop) and at the encoder to be used in the same way in order to obtain exactly the same reference frames at encoder and decoder sides. The aim of this post filtering is to remove compression artefacts.

Figure 2:
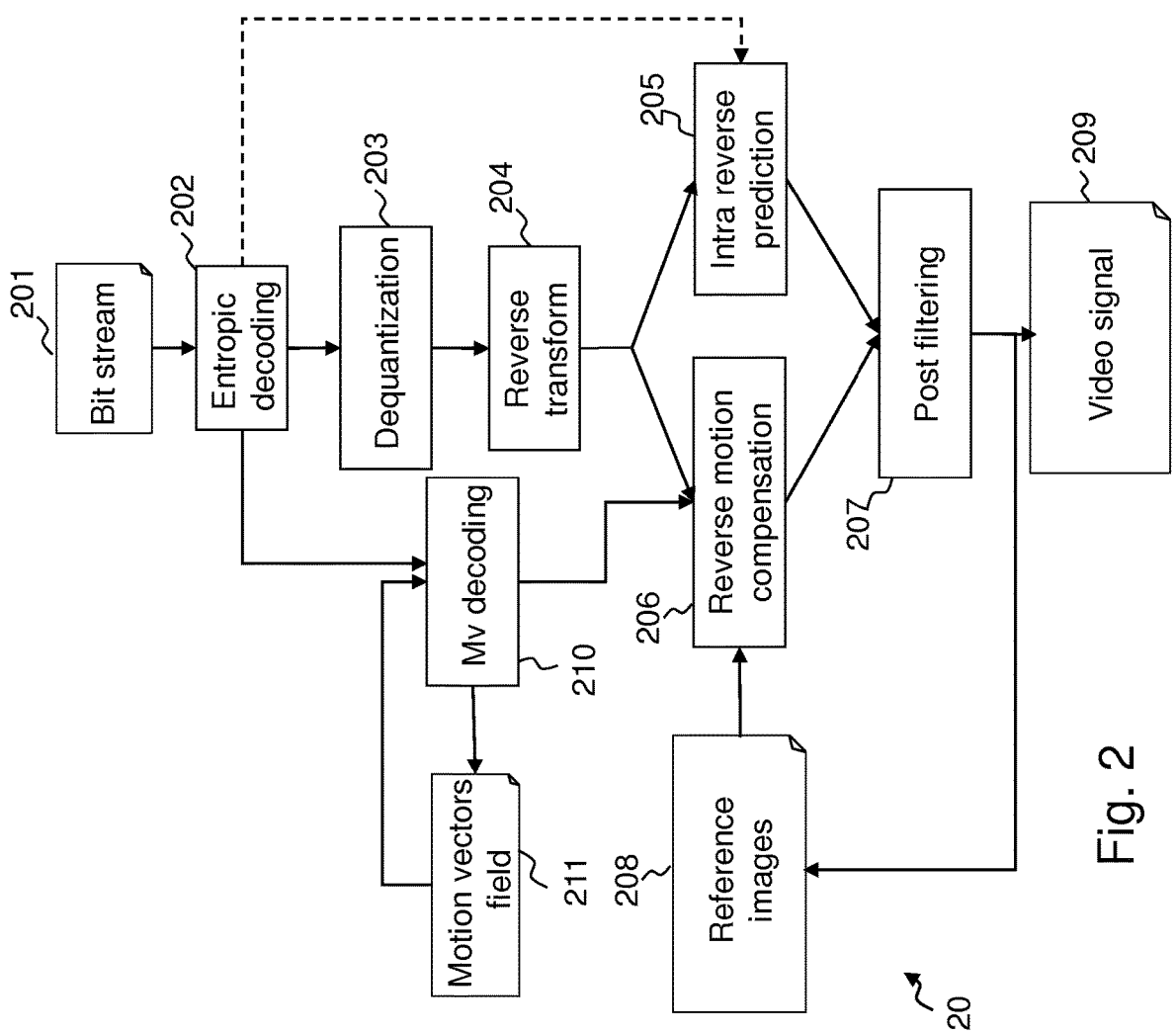
FIG. 2 illustrates the HEVC decoder logical architecture.

FIG. 2 illustrates the corresponding HEVC decoder architecture.

The video stream 201 is first entropy decoded in a module 202. The obtained residual block (Coding Unit) is then inverse quantized in a module 203 and inverse transformed in a module 204 to obtain a "reconstructed" residual block. This is similar to the beginning of the decoding loop at the encoder side.

Next, according to the decoding mode indicated in the bitstream 201 (either INTRA type decoding or an INTER type decoding), a predictor block is built.

In case of INTRA mode, an INTRA predictor block is determined 205 based on the INTRA prediction mode specified in the bitstream 201.

In case of INTER mode, the motion information is extracted from the bitstream during the entropic decoding 202. The motion information is composed of a reference frame index and a motion vector residual.

A motion vector predictor is obtained in the same way as done by the encoder (from neighbouring blocks) using already computer motion vectors stored in motion vector field data 211. It is thus added 210 to the extracted motion vector residual to obtain the motion vector. This motion vector is added to the motion vector field data 211 in order to be used for the prediction of the next decoded motion vectors.

The motion vector is also used to locate the reference area in the reference frame 206 which is the INTER predictor block.

Next, the "reconstructed" residual block obtained at 204 is added to the INTER predictor block 206 or to the INTRA predictor block 205, to obtain a "pre-reconstructed" block (Coding Unit) in the same way as the decoding loop of the encoder.

Next, this "pre-reconstructed" block is post filtered in module 207 as done at the encoder side (a signalling of the post filtering to use may be retrieved from bitstream 201).

A "reconstructed" block (Coding Unit) is thus obtained which forms the de-compressed video 209 as the output of the decoder.

The above-described encoding/decoding process may be applied to monochrome frames. However, most common frames are colour frames generally made of three arrays of colour samples, each array corresponding to a "colour component", for instance R (red), G (green) and B (blue).

R, G, B components have usually high correlation there between. It is thus very common in image and video compression to decorrelate the color components prior to processing the frames, by converting it in another colour space. The most common format is the YUV (YCbCr) where Y is the luma (or luminance) component, and U (Cb) and V (Cr) are chroma (or chrominance) components.

To reduce the amount of data to process, some colour components of the colour frames may be subsampled, resulting in having different sampling ratios for the three colour components. A subsampling scheme is commonly expressed as a three part ratio J:a:b that describes the number of luma and chroma samples in a conceptual 2-pixel-high region. 'J' defines the horizontal sampling reference of the conceptual region (i.e. a width in pixels), usually 4. 'a' defines the number of chroma samples (Cr, Cb) in the first row of J pixels, while 'b' defines the number of (additional) chroma samples (Cr, Cb) in the second row of J pixels.

With the subsampling schemes, the number of chroma samples is reduced compared to the number of luma samples.

The 4:4:4 YUV or RGB format does not provide subsampling and corresponds to a non-subsampled frame where the luma and chroma frames have the same size W×H.

The 4:0:0 YUV or RGB format has only one colour component and thus corresponds to a monochrome frame.

Exemplary sampling formats are the following.

The 4:2:0 YUV format has half less chroma samples in the first row than the luma samples and no chroma samples in the second raw. The two chroma frames are thus W/2-pixel wide and H/2-pixel height, where the luma frame is W×H.

The 4:2:2 YUV format has half less chroma samples in the first row and half less chroma samples in the second raw, than the luma samples. The two chroma frames are thus W/2-pixel wide and H-pixel height, where the luma frame is W×H.

The 4:1:1 YUV format has 75% less chroma samples in the first row and 75% less chroma samples in the second raw, than the luma samples. The two chroma frames are thus W/4-pixel wide and H-pixel height, where the luma frame is W×H.

Figure 3:
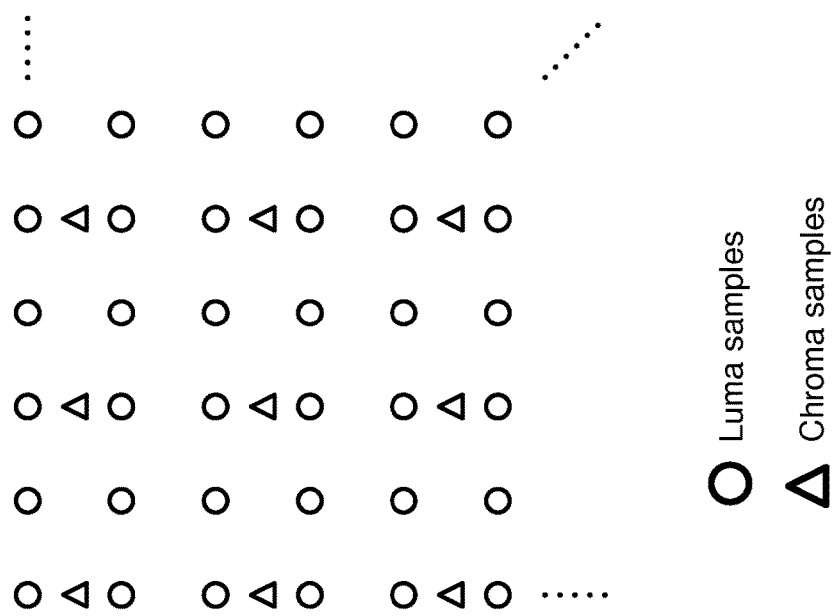
FIG. 3 schematically illustrates examples of a YUV sampling schemes for 4:2:0 sampling.

When subsampled, the positions of the chroma samples in the frames are shifted compared to the luma sample positions. FIG. 3 illustrates an exemplary positioning of chroma samples (triangles) with respect to luma samples (circles) for a 4:2:0 YUV frame.

The encoding process of FIG. 1 may be applied to each colour-component frame of an input frame.

Due to correlations between the colour components (between RGB or remaining correlation between YUV despite the RGB-to-YUV conversion), Cross-Component Prediction (CCP) methods have been developed to exploit these (remaining) correlations in order to improve coding efficiency. The CCP methods are intra prediction method because they rely on the same 3-component frame.

CCP methods can be applied at different stages of the encoding or the decoding process, in particular either at a first prediction order (to predict a current colour component) or at a second prediction order (to predict a current residual block of a component).

One known CCP method is the LM mode, also referred as to CCLM (Cross-Component Linear Model prediction). It is used to predict both chroma components Cb and Cr from the luma Y, more specifically from the reconstructed luma output by the decoding process (possibly the decoding loop at the encoder). One predictor is generated for each component. The method operates at a (chroma and luma) block level, for instance at CTU (coding tree unit), LCU (largest coding unit), CU (coding unit) level, PU (prediction unit) level, sub-PU or TU (transform unit) level.

Figure 4:
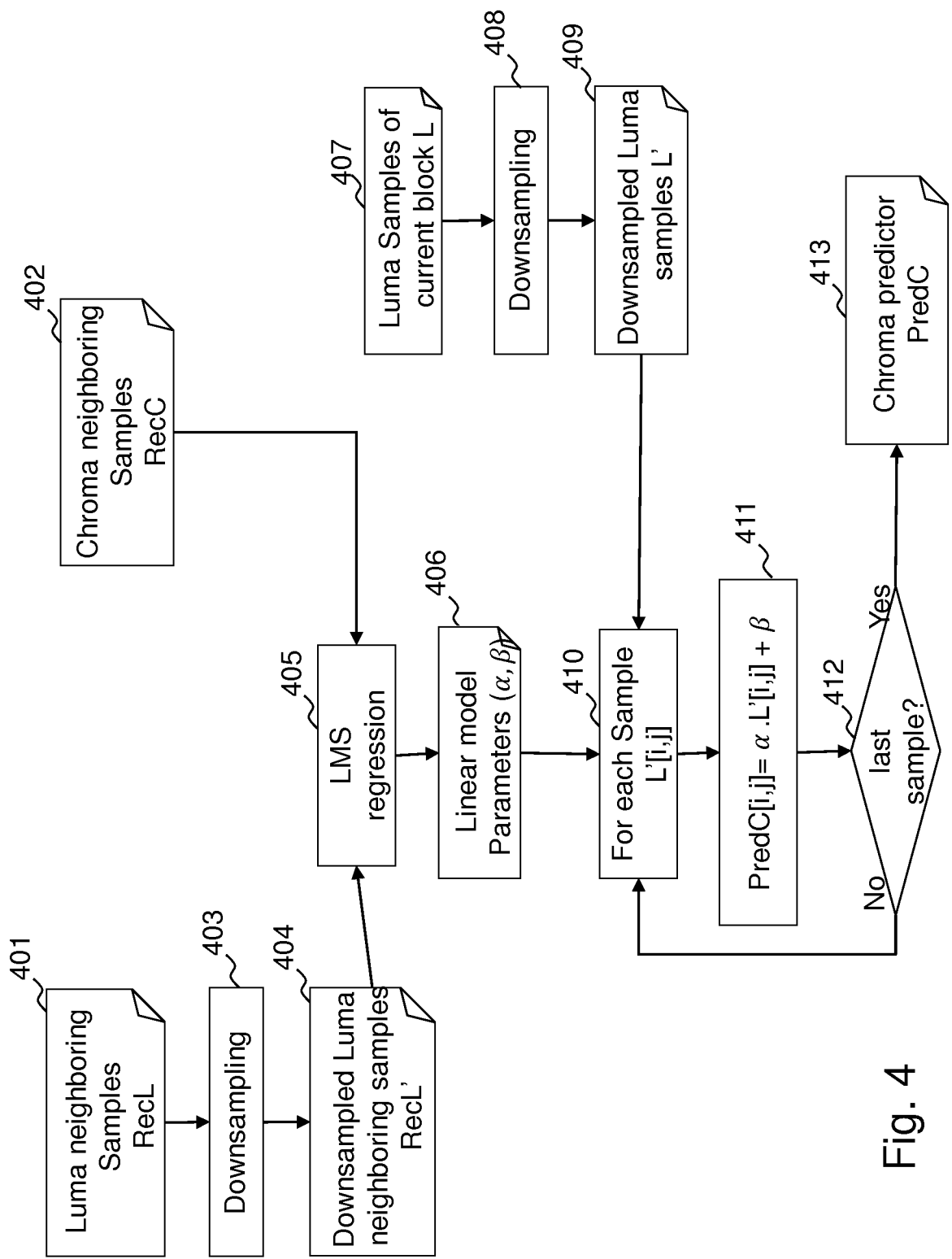
FIG. 4 illustrates, using a flowchart, general steps for generating a block predictor using the LM mode, performed either by an encoder or a decoder.

FIG. 4 illustrates, using a flowchart, general steps for generating a block predictor using the LM mode, performed either by the encoder (used as reference below) or the decoder.

In the description below, an exemplary first colour component is chroma while an exemplary second colour component is luma.

Considering a current chroma block 502 (FIG. 5A) to encode or decode and its associated or corresponding (i.e. "collocated") luma block 505 (i.e. of the same CU for instance) in the same frame, the encoder receives a neighbouring luma sample set RecL comprising luma samples 503 neighbouring the current luma block at step 401, and receives a neighbouring chroma sample set RecC comprising chroma samples 501 neighbouring the current chroma block at step 402.

When a chroma sampling format is used (e.g. 4:2:0, 4:2:2, etc.), the neighbouring luma sample set is down-sampled at step 403 into RecL' 404 to match chroma resolution (i.e. the sample resolution of the corresponding chroma frame/block). RecL' thus comprises reconstructed luma samples 504 neighbouring the current luma block that are down-sampled. Thanks to the down-sampling, RecL' and RecC comprise the same number 2N of samples (chroma block 502 being N×N).

Figure 5:
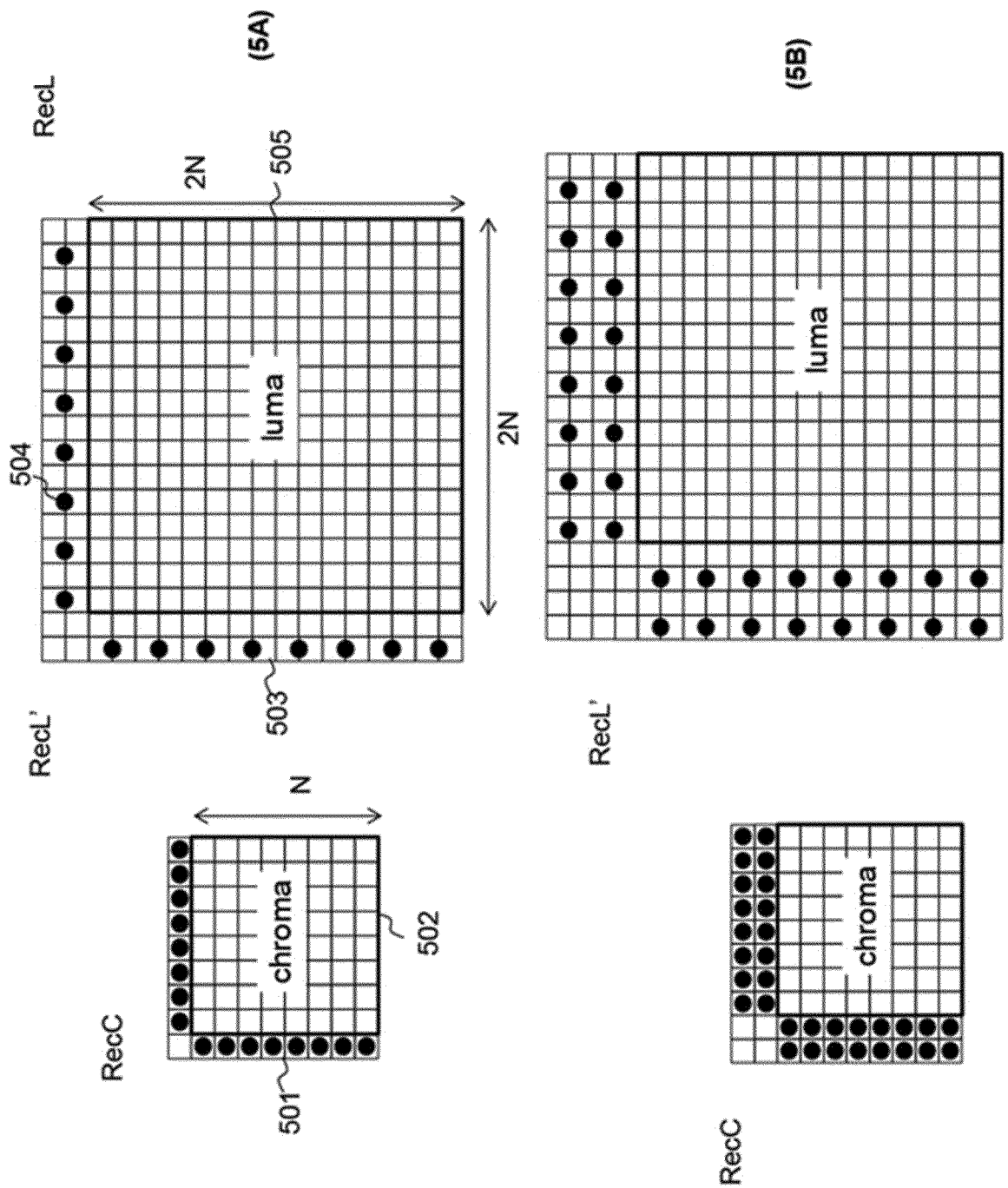
FIG. 5 schematically illustrates a chroma block and an associated or collocated luma block, with down-sampling of the luma samples, and neighbouring chroma and luma samples, as known in prior art.

In the example of FIG. 5A, the neighbouring luma and chroma sample sets are made of the down-sampled top and left neighbouring luma samples and of the top and left neighbouring chroma samples, respectively. More precisely each of the two sample sets is made of the first line immediately adjacent to the left boundary and the first line immediately adjacent to the top boundary of their respective luma or chroma block. Due to down-sampling (4:2:0 in FIG. 5A), the single line of neighbouring luma samples RecL' is obtained from two lines of non down-sampled reconstructed luma samples RecL.

Figure 6:
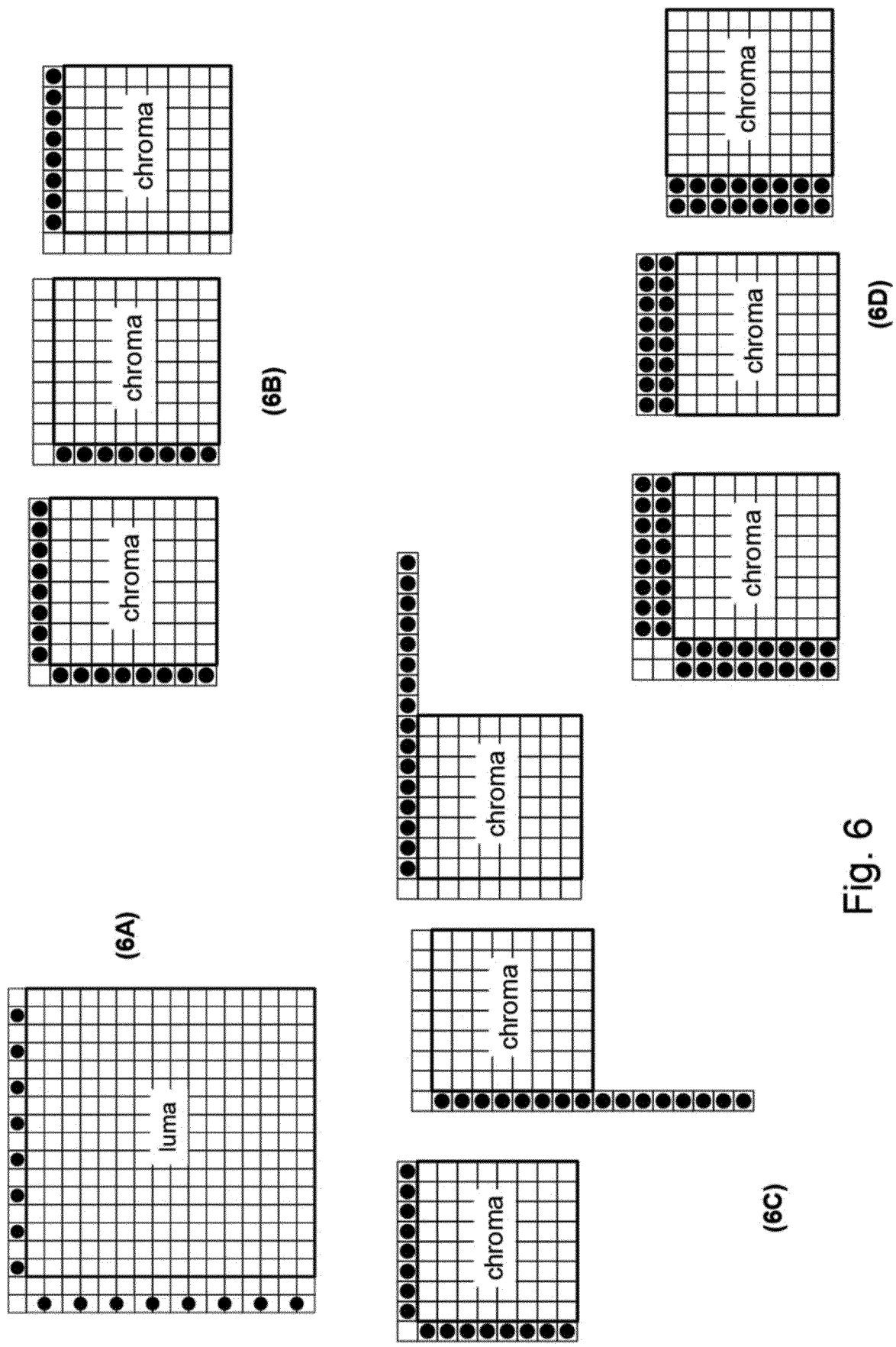
FIG. 6 schematically illustrates exemplary sample sets for LM parameter derivation as known in prior art.

U.S. Pat. No. 9,565,428 suggests using sub-sampling which selects a single sample, only for the up line (i.e. adjacent to the top boundary of the luma block) and not for the luma block itself (as described below with reference to step 408). The proposed sub-sampling is illustrated in FIG. 6A. The motivation of this approach is to reduce the line buffer of the up line.

The linear model (defined by one or two parameters, a slope $\alpha$ and an offset $\beta$) is derived from RecL' (if any, otherwise RecL) and RecC. This is step 405 to obtain the parameters 406.

The LM parameters $\alpha$ and $\beta$ are obtained using a least square-based method following the equation:

$$\alpha = \frac{M \sum_{i=1}^{M} RecC_i RecL'_i - \sum_{i=1}^{M} RecC_i \sum_{i=1}^{M} RecL'_i}{M \sum_{i=1}^{M} RecL'^2_i - \left(\sum_{i=1}^{M} RecL'_i\right)^2} = \frac{A_1}{A_2}$$

$$\beta = \frac{\sum_{i=1}^{M} RecC_i - \alpha \sum_{i=1}^{M} RecL'_i}{M}$$

with M a value which depends on the size of the block considered. In general cases of square blocks as shown in the Figures, M=2N. However, the LM-based CCP may apply to any block shape where M is for instance block height H+block width W (for a rectangle block shape).

Note that the value of M used as a weight in this equation may be adjusted to avoid computational overflows at the encoder. To be precise, when using arithmetic with 32-bits or 64-bits signed architectures, some of the computations may sometimes overflow and thus cause unspecified behavior (which is strictly prohibited in any cross platform standard). To face this situation, the maximum magnitude possible given inputs RecL' and RecC values may be evaluated, and M (and in turns the sums above) may be scaled accordingly to guarantee no overflow occurs.

The derivation of the parameters is usually made from the sample sets RecL' and RecC shown in FIG. 5A.

Variations of the samples sets have been proposed.

For instance, U.S. Pat. No. 9,288,500 proposes three competing sample sets, including a first sample set made of the outer line adjacent to the top boundary and the outer line adjacent to the left boundary, a second sample set made of only the outer line adjacent to the top boundary and a third sample set made of only the outer line adjacent to the left boundary. These three sample sets are shown in FIG. 6B for the chroma block only (and thus can be transposed to the luma block).

U.S. Pat. No. 9,462,273 extends the second and third sample sets to additional samples extending the outer lines (usually doubling their length). The extended sample sets are shown in FIG. 6C for the chroma block only. This document also provides reducing the number of LM modes available in order to decrease the signalling costs for signalling the LM mode used in the bitstream. The reduction may be contextual, for instance based on the Intra mode selected for the associated luma block.

U.S. Pat. No. 9,736,487 proposes three competing sample sets similar to those of U.S. Pat. No. 9,288,500 but made, each time, of the two lines of outer neighbouring samples parallel and immediately adjacent to the boundaries considered. These sample sets are shown in FIG. 6D for the chroma block only.

Also U.S. Pat. No. 9,153,040 and the documents of the same patent family propose additional sample sets made of a single line per boundary, with less samples per line than the previous sets.

Back to the process of FIG. 4, using the linear model with the one or more parameters derived 406, a chroma intra predictor 413 for chroma block 502 may thus be obtained from the reconstructed luma samples 407 of the current luma block 505. Again if a chroma sampling format is used (e.g. 4:2:0, 4:2:2, etc.), the reconstructed luma samples are down-sampled at step 408 into L' 409 to match chroma resolution (i.e. the sample resolution of the corresponding chroma frame/block).

The same down-sampling as for step 403 may be used, or another one for line buffer reason. For instance, a 6-tap filter may be used to provide the down-sampled value as a weighted sum of the top left, top, top right, bottom left, bottom and bottom right samples surrounding the down-sampling position. When some surrounding samples are missing, a mere 2-tap filter is used instead of the 6-tap filter.

Applied to reconstructed luma samples L, output L' of an exemplary 6-tap filter is obtained as follows:

$$L'[i, j] = (2 \times L[2i, 2j] + 2 \times L[2i, 2j+1] + L[2i-1, 2j] + \\ L[2i+1, 2j] + L[2i-1, 2j+1] + L[2i+1, 2j+1] + 4) >> 3$$

with (i,j) the coordinates of the sample within the down-sampled block.

and >> is the bit-right-shifting operation.

Also an adaptive luma down-sampling may be used as described in US 2017/0244975. The sole content of the luma block is used to determine which down-sampling filter to use for each reconstructed luma sample of the luma block. A 1-tap filter is available. The motivation of this approach is to avoid propagation of an edge in the down-sampled luma block.

Thanks to down-sampling 403, L' and C (the set of chroma samples in chroma block 502) comprise the same number N^2 of samples (chroma block 502 being N×N).

Next, each sample of the chroma intra predictor PredC 413 is calculated using the lop 410-411-412 following the formula PredC[i,j]=αRecL'[i,j]+β with (i,j) the coordinates of all samples within chroma block.

To avoid divisions and multiplications, the computations may be implemented using less complex methods based on look-up tables and shift operations. For instance, the actual chroma intra predictor derivation 411 may be done as follows:

PredC[i,j]=(A·L'[i,j])>>S+β where S is an integer and A is derived from A1 and A2 (introduced above when computing α and β) using the look-up table mentioned previously. It actually corresponds to a rescaled value of α. >> is the bit-right-shifting operation.

When all samples of the down-sampled luma block have been parsed (412), the chroma intra predictor 413 is available for subtraction from chroma block 502 (to obtain a chroma residual block) at the encoder side or for addition to a chroma residual block (to obtain a reconstructed chroma block) at the decoder side.

Note that the chroma residual block may be insignificant and thus discarded, in which case the obtained chroma intra predictor 413 directly corresponds to predicted chroma samples (forming chroma block 502).

Both standardization groups ITU-T VCEG (Q6/16) and ISO/IEC MPEG (JTC 1/SC 29/WG 11) which have defined the HEVC standard are studying future video coding technologies for the successor of HEVC in a joint collaboration effort known as the Joint Video Exploration Team (JVET). The Joint Exploration Model (JEM) contains HEVC tools and new added tools selected by this JVET group. In particular, this reference software contains some CCP tools, as described in document JVET-G1001.

In the JEM, a total of 11 intra modes are allowed for chroma coding. Those modes include five traditional intra modes and six cross-component LM modes to predict Cb from Y (signalled in bitstream 110, 201) and one cross-component LM mode to predict Cr from Cb.

One of the six Y-to-Cb CC LM modes is the CCLM described above, in which the neighbouring luma and chroma sample sets RecL', RecC are each made of the first line immediately adjacent to the left boundary and the first line immediately adjacent to the top boundary of their respective luma or chroma block as shown in FIG. 5A.

The five other Y-to-Cb CC LM modes are based on a particular derivation known as the Multiple Model (MM). These modes are labelled MMLM.

Compared to CCLM, the MMLM modes use two linear models. The neighbouring reconstructed luma samples of RecL' and the neighbouring chroma samples of RecC are classified into two groups, each group being used to derive the parameters α and β of one linear model.

For instance, a threshold may be calculated as the average value of the neighbouring reconstructed luma samples forming RecL'. Next, a neighbouring luma sample with RecL'[i,j]≤threshold is classified into group 1; while a neighbouring luma sample with RecL'[i,j]>threshold is classified into group 2.

Next, the chroma intra predictor (or the predicted chroma samples for current chroma block 602) is obtained according to the following formulas:

PredC[i,j]=α$_1$·L'[i,j]+β$_1$, if L'[i,j]≤thresold

PredC[i,j]=α$_2$·L'[i,j]+β$_2$, if L'[i,j]<thresold

In addition, compared to CCLM, the MMLM modes use neighbouring luma and chroma sample sets RecL', RecC each made of the two lines of outer neighbouring samples parallel and immediately adjacent to the left and top boundaries of the block considered. An example is shown in FIG. 5B illustrating a 4:2:0 sampling format for which the two lines of neighbouring luma samples are obtained (using down-sampling) from four lines of non down-sampled reconstructed luma samples.

The five MMLM modes differ one from the other by five different down-sampling filters to down-sample the reconstructed luma samples to match chroma resolution (to obtain RecL' and/or L').

A first MMLM mode relies on the same 6-tap filter as used in CCLM (see 701 of FIG. 7). The second to fourth MMLM modes rely on 2-tap filters which respectively provide the down-sampled value as a weighted sum of:

the top right and bottom right samples of the six samples (used by the 6-tap filter) surrounding the down-sampling position (see filter 1, 702 of FIG. 7):

$L'[i,j]=(L[2i+1,2j]+L[2i+1,2j+1]+1)>>1$ (the same applies with RecL), the bottom and bottom right samples of the six samples (used by the 6-tap filter) surrounding the down-sampling position (see filter 2, 703 of FIG. 7):

$L'[i,j]=(L[2i,2j+1]+L[2i+1,2j+1]+1)>>1$, and the top and top right samples of the six samples (used by the 6-tap filter) surrounding the down-sampling position (see filter 4, 705 of FIG. 7):

$L'[i,j]=(L[2i,2j]+L[2i+1,2j]+1)>>1$.

The fifth MMLM mode relies on 4-tap filter which provides the down-sampled value as the weighted sum of the top, top right, bottom and bottom right samples of the six samples (used by the 6-tap filter) surrounding the down-sampling position (see filter 3, 704 of FIG. 7):

$L'[i,j]=(L[2i,2j]+L[2i,2j+1]+L[2i+1,2j]+L[2i+1,2j+1]+2)>>2$.

As indicated above, the CCLM or MMLM mode has to be signalled in bitstream 110 or 201. FIG. 8 illustrates an exemplary LM mode signalling of JEM. A first binary flag indicates if the current block is predicted using an LM mode or a DM mode. In case of LM mode, the six possible modes need to be signalled. The first MMLM mode (using the 6-tap filter) is signalled with one second binary flag set to 1. This second binary flag is set to 0 for the remaining modes, in which case a third binary flag is set to 1 to signal the CCLM mode and is set to 0 for the remaining MMLM modes. Two additional binary flags are then used to signal one of the four remaining MMLM modes.

One mode is signalled for each chroma component.

The Cb-to-Cr CC LM mode introduced above is used in the DM mode, and applies at residual level. The prediction for the Cr residual is obtained from the Cb residual (ResidualCb below) by the following formula:

$PredCr[i,j]=\alpha ResidualCb[i,j]$ where α is derived in a similar way as in the CCLM luma-to-chroma prediction. The only difference is the addition of a regression cost relative to a default α value in the error function so that the derived scaling factor is biased towards a default value of −0.5 as follows:

$$\alpha = \frac{M\sum_{i=1}^{M} RecCb_i RecCr_i - \sum_{i=1}^{M} RecCb_i \sum_{i=1}^{M} RecCr_i + \lambda(-0.5)}{M\sum_{i=1}^{M} RecCb_i^2 - \left(\sum_{i=1}^{M} RecCb_i\right)^2 + \lambda}$$

where $RecCb_i$ represents the neighbouring reconstructed Cb samples, $RecCr_i$ represents the neighbouring reconstructed Cr samples, and
λ is equal to $$\sum_{i=1}^{M} RecCb_i^2 >> 9.$$

The competition between the various LM modes in the JEM software provides quite good results in term of frame compression. However, it requires numerous computations, in particular because the down-sampling filters used are weighted sums.

The present invention seeks to improve the situation in term of coding efficiency and/or computational complexity.

An improvement in computational complexity is achieved by using appropriate down-sampling schemes when down-sampling the reconstructed luma samples (either the samples of current luma block 505 itself just before applying the linear model regression or the samples 503 neighbouring the current luma block 505 during the parameter deriving step) to match chroma resolution.

The down-sampling schemes available are evaluated during a competition at the encoder, for instance based on a rate-distortion criterion. The decoder only has to retrieve the corresponding signalling information from the bitstream. One scheme is selected per block.

The competition may occur for down-sampling 408 the reconstructed luma samples of the luma block 505 or for down-sampling 403 the reconstructed luma samples of the neighbouring sample set RecL, or both. In the first case, the same selected competing (or reference) down-sampling scheme is used to down-sample the reconstructed luma samples of the current luma block to chroma resolution before using the linear model with the one or more parameters derived to obtain the chroma sample. In the second case, the same selected reference down-sampling scheme is used for all reconstructed luma samples neighbouring the current luma block to obtain the reconstructed neighbouring luma sample set.

Embodiments of the invention thus provide that the plurality of reference down-sampling schemes comprises at least two subsampling 1-tap filters that each selects, as down-sampled reconstructed luma sample at a down-sampling position, one different reconstructed luma sample in the vicinity of the down-sampling position. Top of FIG. 7 (filter 701) discussed above illustrates a conventionally-admitted down-sampling position for luma samples. In this position, the immediate vicinity of the down-sampling position includes six surrounding samples, namely the top, top right, bottom and bottom right samples of six reconstructed luma samples.

The use of 1-tap filters (which correspond to a mere subsampling) advantageously avoids weighted sums to be computed during the competition. The computation complexity is thus decreased because it is just a copy of one sample instead of a filtering compared to the JEM LM modes.

On the other hand, the inventor has surprisingly noticed that the coding efficiency is not reduced but kept stable, although 1-tap filters are used. As a result, a good chroma intra predictor is still obtained. As the chroma residual block may be disregarded (if insubstantial), good predicted chroma samples are also obtained from the reconstructed luma samples.

Figure 9:
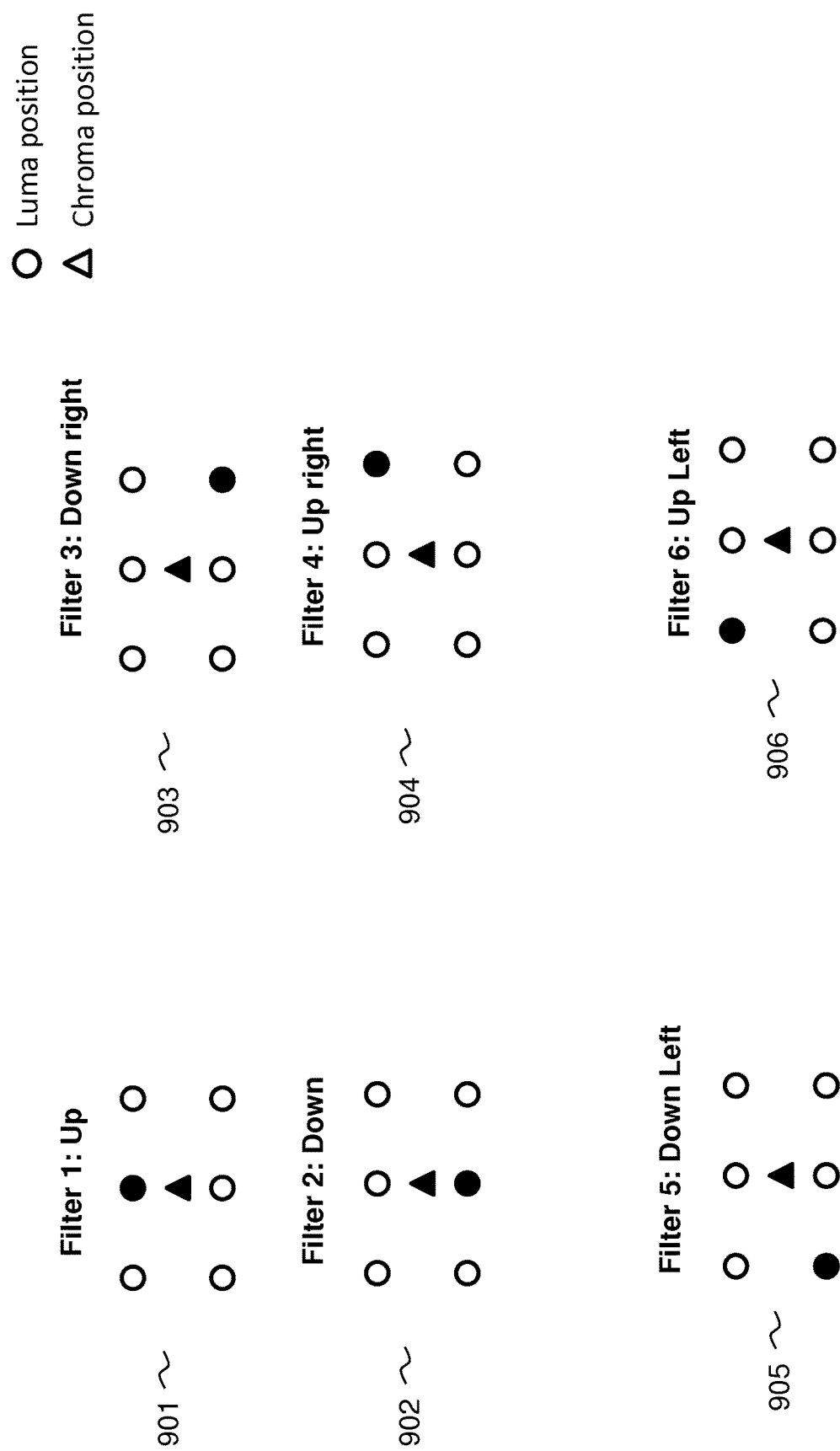
FIG. 9 illustrates newly proposed 1-tap down-sampling filters used in embodiments of the present invention.

FIG. 9 illustrates the six possible 1-tap filters built from the six surrounding samples mentioned above (conventionally used for a 6-tap filter).

The "up filter" 901 selects the top sample. For instance, regarding the down-sampling within the reconstructed luma sample set RecL: RecL'[i, j]=RecL[2i,2j].

The "down filter" 902 selects the bottom sample: RecL'[i, j]=RecL[2i,2j+1].

The "down right filter" 903 selects the bottom right sample:

RecL'[i,j]=RecL[2i+1,2j+1].

The "up right filter" 904 selects the top right sample: RecL[i, j], RecL[2i,2 j+1].

The "down left filter" 905 selects the bottom left sample: RecL'[i, j]=RecL[2i−1,2j].

The "up left filter" 906 selects the top left sample: RecL[i,j]=RecL[2i−1,2j−1].

Any pair (or more) of these six 1-tap filters may be chosen to build the set of reference down-sampling schemes.

However, no decreasing in coding efficiency is observed when any subsampling 1-tap filter thus chosen is one of filters 901 to 904, i.e. selects one from top, top right, bottom and bottom right samples of six reconstructed luma samples surrounding the down-sampling position. Best results are obtained when the four filters 901 to 904 are chosen for competition, without filters 905 and 906. In particular, these filters use reconstructed luma samples that are always available (contrary to the left samples when down-sampling the leftmost lines of RecL).

Of course, if filters 905 and 906 are used, the unavailability of left samples in the leftmost lines of RecL (e.g. because they are outside the frame or outside memory buffer) must be compensated. It is thus proposed to switch from down left filter 905 to down filter 902 and/or to switch from up left filter 906 to up filter 901 where appropriate.

In a preferred embodiment, only the four filters 901 and 904 are chosen for competition in addition to an n-tap filter (n≥2), for instance a 6-tap filter 701. In that case, the reference down-sampling schemes include a n-tap filter determining a down-sampled reconstructed luma sample from n reconstructed luma samples in the vicinity of the down-sampling position, for instance the 6-tap filter determining a down-sampled reconstructed luma sample from top left, top, top right, bottom left, bottom and bottom right samples of six reconstructed luma samples surrounding the down-sampling position.

Indeed, when the 1-tap filter up 901, down 902, down right 903 and up right 904 replace respectively filters 702, 703, 704 and 705, it produces no loss of coding efficiency.

In some embodiments, the proposed 1-tap filters are only used for the down-sampling 403 of the reconstructed luma sample set RecL into RecL' in order to derive the LM parameters α and β, and not for the down-sampling 408 of the luma block 505 itself. The down-sampling 408 of the luma block 505 itself may thus be the same for several or all LM modes (i.e. regardless of which down-sampling scheme, be it 1-tap filter or not, is used for RecL). This approach substantially simplifies the hardware design.

In a symmetrical fashion, the proposed 1-tap filters are only used for the down-sampling 408 of the luma block 505 itself just before applying the LM with the parameters derived, and not for the down-sampling 403 of the reconstructed luma sample set RecL into RecL'. The down-sampling 403 of RecL into RecL' may thus rely on a conventional filter, such as the 6-tap filter 701, for several or all LM modes. This approach also substantially simplifies the hardware design in particular because the same LM parameters α and β are derived and used for several to all LM modes.

An improvement in coding efficiency may be achieved by the present invention by using appropriate sample sets for the LM parameter derivation, i.e. to define neighbouring first-colour-component and second-colour-component sample set for the parameter derivation. Here below new sample sets are proposed, which are irregular compared to the known ones.

These new sample sets may be used in the luma-to-chroma intra prediction, in which case the first colour component is chroma and the second colour component is luma. However, more generally, they may be used in any CCP (between RGB components or YUV components for instance). Also as a residual block may be disregarded (if insubstantial), the new sample sets may be used to directly obtain any first-colour-component sample from second-colour-component samples, rather than a mere intra predictor.

The sample sets available are evaluated during a competition at the encoder, for instance based on a rate-distortion criterion. The decoder only has to retrieve the corresponding signalling information from the bitstream. One sample set is selected per block.

Embodiments of the invention thus provide that the plurality of competing or reference sample sets includes one or more irregular sample sets. A so-called "irregular" sample set is defined as follows:

It is built from the two lines of outer neighbouring samples parallel and (preferably immediately) adjacent to the top boundary of the block currently considered (e.g. either luma or chroma block for luma-to-chroma prediction) and the two lines of outer neighbouring samples parallel and adjacent to the left boundary of the same block, for at least one position along the top or left boundary of the block, only one sample is selected from the sample of the first line adjacent to the boundary and the sample of the next and second line, and at least one sample of the next and second line along the same boundary is selected.

Figure 10:
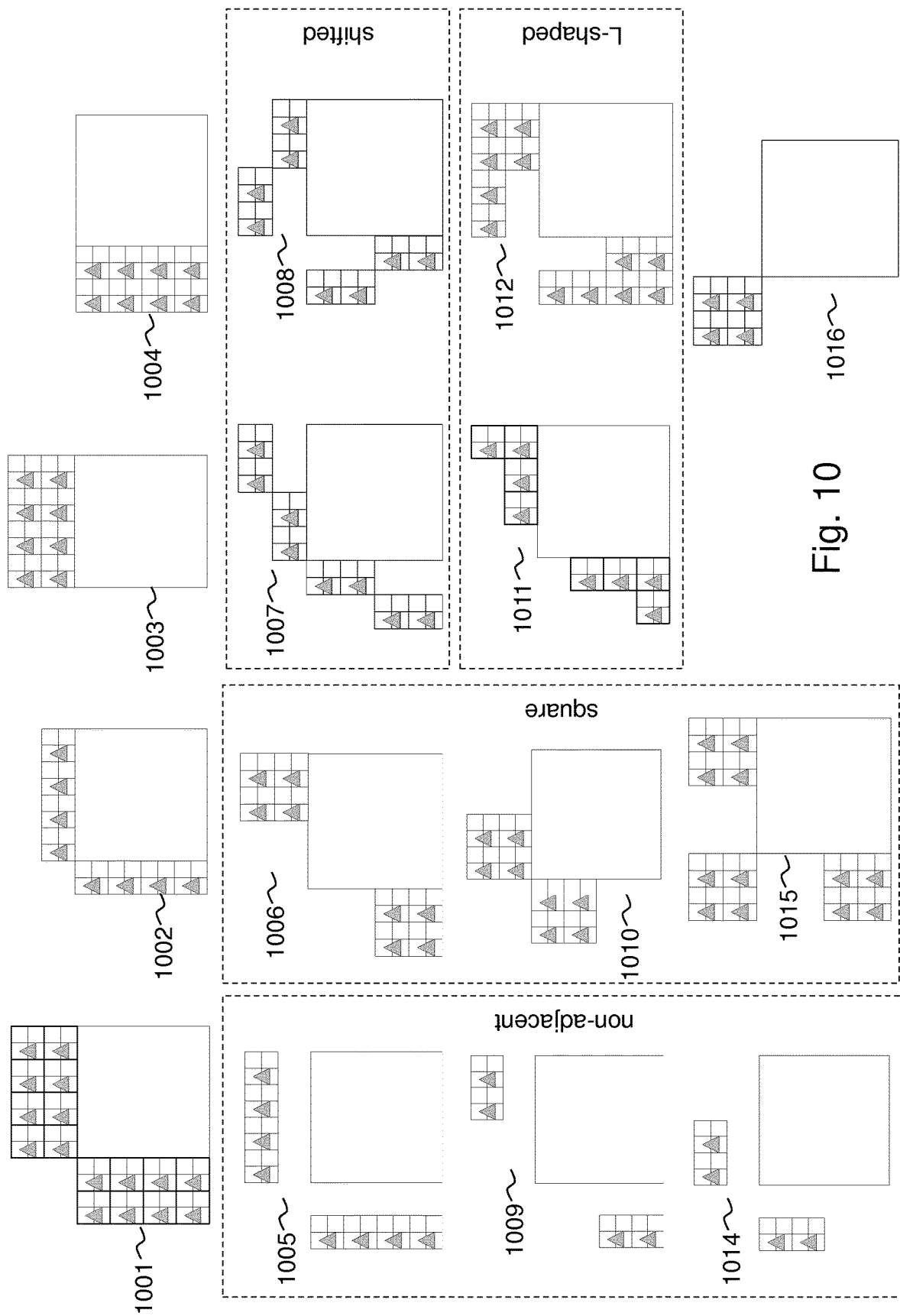
FIG. 10 illustrates known regular sample sets and newly proposed irregular sample sets used for the derivation of the linear model in embodiments of the invention.

Exemplary irregular sample sets are shown with references 1005 to 1015 in FIG. 10. They are described below with more details.

The inventor notices that the usage of such sample sets with irregular shapes, for instance in the process of FIG. 4 (for RecL/RecL' and RecC), substantially improves coding efficiency by creating a diversity among the possible LM parameters. Indeed, the diversity is sometimes more efficient than "regular" shaped conventionally used to exploit correlation between colour components.

Top of FIG. 10 shows regular sample sets 1001, 1002, 1003 and 1004 already discussed on above with reference to FIGS. 6A and 6D. The sample sets of FIGS. 6B and 6C are also regular ones.

As the regular sample sets are on average more efficient than the irregular ones, it is proposed that the plurality of reference sample sets includes, at the same time, one or more irregular sample sets and regular sample sets, preferably sample sets 1001, 1002, 1003 and 1004.

The irregular sample sets 1005 to 1015 shown in FIG. 10 form a subset of all possible irregular sample sets. In all of them, at least one sample in the first line is not selected.

Furthermore, they are each "symmetrical", meaning the sample shape along the top boundary looks like the sample shape along the left boundary. In other words, the samples selected along the top boundary for one or more irregular sample sets form a top sample shape that is identical to or mirrored from a left sample shape forming the samples selected along the left boundary.

An interesting and efficient subset of irregular sample sets is made of so-called non-adjacent sample sets that comprise, along the same top or left boundary (preferably both), samples from the next and second line only. Irregular sample sets 1005, 1009 and 1014 are exemplary non-adjacent sample sets.

Another relevant subset of irregular sample sets is made of so-called shifted sample sets that comprise, for the same position along the top or left boundary (preferably both), at most one from the sample of the first line and the sample of the next and second line. Irregular sample sets 1007 and 1008 are exemplary shifted sample sets, which comprise exactly one sample from the sample of the first line and the sample of the next and second line, for each position along the top or left boundary (preferably both).

Another relevant subset of irregular sample sets is made of so-called L-shaped sample sets that comprise, along the same top or left boundary (preferably both), the samples of the first and second lines for a first position along the boundary and only one sample from the sample of the first line and the sample of the next and second line for a second and different position along the boundary. Irregular sample sets 1011 and 1012 are exemplary L-shaped sample sets, in which the position or positions with the two samples selected follow the position or positions with one sample selected.

Yet another relevant subset of irregular sample sets is made of so-called square sample sets that comprise the samples of the first and second lines for each position of a continuous subpart of positions along the top or left boundary (preferably both) and comprising, for the remaining subpart or subparts of positions, no sample from the first and second lines. Irregular sample sets 1006, 1010 and 1015 are exemplary square sample sets.

Irregular sample sets 1005, 1009, 1011, 1012 and 1014 are also representative of the subset of irregular sample sets comprising a different number of samples from the first line and of samples from the next and second line.

Sample sets 1005 to 1014 can be extended by adding them the four samples forming a square continuing, at the top left corner of the current block, the two lines adjacent to the top and left boundaries. These four samples are shown in reference 1016.

An example of such extension is shown in 1015 which corresponds to the irregular and square sample set 1006 once extended.

In one specific embodiment of the invention, several LM modes are competing at the encoder side, wherein at least one mode uses the regular sample set 1001, at least one uses the regular sample set 1002, at least one uses the regular sample set 1003 and/or 1004, and at least one uses one irregular sample set 1105 to 1015 (or its extended version).

Variations of the irregular sample sets may be automatically generated based on the values of the samples themselves. This is to create more diversity between the sample sets.

Figure 11:
FIG. 11 schematically illustrates a process of samples selection to form sample sets in embodiments of the invention.

FIG. 11 illustrates an embodiment generating irregular sample sets based on sample values. In this example, the selection of samples to keep is based on the values of the luma samples 1101 (of the lines neighbouring the top and left boundaries of the block). Of course, it is also possible to select the samples to keep based on the value of the chroma samples or on both luma and chroma samples.

As shown in the Figure, the min and max values of the neighbouring yet down-sampled luma samples RecL' are determined at 1102. The range of luma samples is then split into two parts to form two corresponding groups of luma samples.

In the present example, the first group is made of the luma samples inferior to Min+(Max−Min)/4 and of the luma samples superior to Max−(Max−Min)/4. The second group is made of the other luma samples, i.e. comprises between Min+(Max−Min)/4 and Max−(Max−Min)/4. Of course other sample values to split the range may be used.

The samples of the first group are selected (1103) to create the samples set 1104 for the current LM mode. The advantage of selecting the extremum values of the luma samples is a higher diversity in the linear model parameters compared to the others. Of course, the medium values may also be selected as an alternative.

The above described competition at the encoder between down-sampling filters including 1-tap filters and competition between sample sets including irregular sample sets can be combined in the same intra prediction process or process to obtain chroma samples.

It is thus needed to signal, in the bitstream for the current block, the down-sampling filter used and the sample set used so that the decoder can apply the right LM mode. Thus two flags are required, each having enough bits to signal each possible filter or sample set possible.

However, when there are too many LM modes (an LM mode being made of one down-sampling scheme and one sample set) available given the possible combinations of down-sampling schemes and sample sets, there may be no coding efficiency improvement due to the signalling cost.

In this context, it may be worth reducing the number of LM modes by providing specific combinations of down-sampling filter and sample set. This results in an improved coding efficiency.

For instance, a plurality of reference LM modes is available and one of the reference LM modes has to be selected to down-sample, using the thus-selected down-sampling scheme, the reconstructed luma samples to match chroma resolution for the parameter derivation and for the chroma intra predictor generation and to define, using the thus-selected sample set, the neighbouring luma and chroma sample sets for the parameter derivation.

As an example, six LM modes may be built from:
the following set of down-sampling filters: 6-tap filter 701, up filter 901, down filter 902, down right filter 903, up right filter 904, and
the following set of sample sets: single full line at top and left boundaries (1002), two full lines at top and left boundaries (1001), two full lines at top boundary only (1003), two full lines at left boundary only (1004), second full line only at top and left boundaries (1005).

For instance the following LM modes are competing:
CCLM made of 6-tap filter 701 plus single full line at top and left boundaries (1002),
MMLM made of 6-tap filter 701 plus two full lines at top and left boundaries (1001),
MMLM filter 1 made of up filter 901 plus two full lines at top boundary only (1003),
MMLM filter 2 made of down filter 902 plus single full line at top and left boundaries (1002),
MMLM filter 3 made of down right filter 903 plus two full lines at left boundary only (1004), and
MMLM filter 4 made of up right filter 904 plus second full line only at top and left boundaries (1005).

Figure 12:
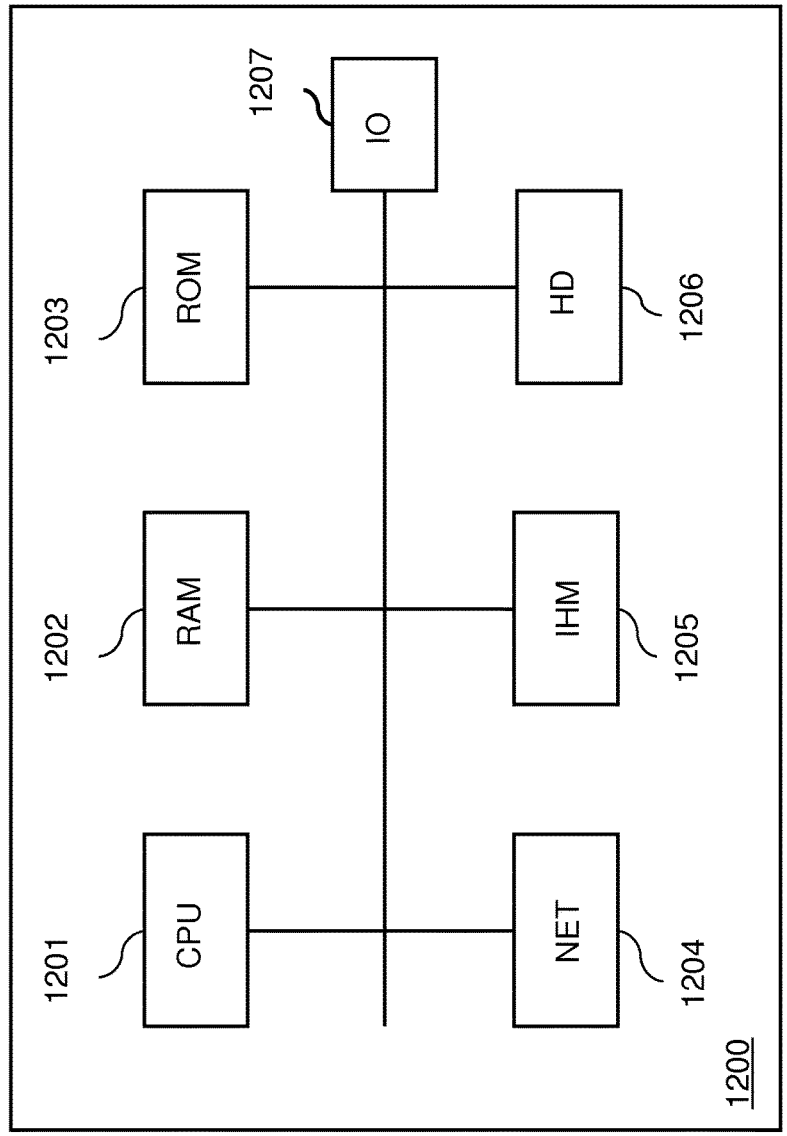
FIG. 12 is a schematic block diagram of a computing device for implementation of one or more embodiments of the invention.

FIG. 12 is a schematic block diagram of a computing device 1200 for implementation of one or more embodiments of the invention. The computing device 1200 may be a device such as a micro-computer, a workstation or a light portable device. The computing device 1200 comprises a communication bus connected to:
a central processing unit 1201, such as a microprocessor, denoted CPU;
a random access memory 1202, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 1203, denoted ROM, for storing computer programs for implementing embodiments of the invention;

a network interface 1204 is typically connected to a communication network over which digital data to be processed are transmitted or received. The network interface 1204 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1201;

a user interface 1205 may be used for receiving inputs from a user or to display information to a user;

a hard disk 1206 denoted HD may be provided as a mass storage device;

an I/O module 1207 may be used for receiving/sending data from/to external devices such as a video source or display.

The executable code may be stored either in read only memory 1203, on the hard disk 1206 or on a removable digital medium such as for example a disk. According to a variant, the executable code of the programs can be received by means of a communication network, via the network interface 1204, in order to be stored in one of the storage means of the communication device 1200, such as the hard disk 1206, before being executed.

The central processing unit 1201 is adapted to control and direct the execution of the instructions or portions of software code of the program or programs according to embodiments of the invention, which instructions are stored in one of the aforementioned storage means. After powering on, the CPU 1201 is capable of executing instructions from main RAM memory 1202 relating to a software application after those instructions have been loaded from the program ROM 1203 or the hard-disc (HD) 1206 for example. Such a software application, when executed by the CPU 1201, causes the steps of the method according to the invention to be performed.

Any step of the methods according to the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of obtaining a first-colour-component sample for a current first-colour-component block of a multi-colour-component frame from an associated reconstructed second-colour-component sample of a current second-colour-component block in the same frame using a linear model with one or more parameters, the two blocks having the same size, the method comprising:

deriving the one or more parameters of the linear model based on a neighbouring first-colour-component sample set comprising first-colour-component samples neighbouring the current first-colour-component block and a neighbouring second-colour-component sample set comprising reconstructed second-colour-component samples neighbouring the current second-colour-component block, and obtaining the first-colour-component sample using the linear model with the one or more parameters derived and the associated reconstructed second-colour-component sample in the current second-colour-component block, wherein deriving the one or more parameters includes obtaining one from a plurality of reference sample sets to define the neighbouring first-colour-component and second-colour-component sample sets for the parameter derivation, the plurality of reference sample sets including one or more irregular sample sets, wherein an irregular sample set is built from two lines of outer neighbouring samples parallel and adjacent to the top boundary of the current block and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

2. The method of claim 1, wherein at least one sample in the first line is not selected to build one or more of the irregular sample sets.

3. The method of claim 1, wherein, for each of the top and left boundaries, the two lines are immediately adjacent to the boundary considered.

4. The method of claim 3, wherein the one or more irregular sample sets includes at least one non-adjacent sample set comprising, along the same top or left boundary, samples from the next and second line only.

5. A method of obtaining a first-colour-component sample for a current first-colour-component block of a multi-colour-component frame from an associated reconstructed second-colour-component sample of a current second-colour-component block in the same frame using a linear model with one or more parameters, the two blocks having the same size, the method comprising:

deriving the one or more parameters of the linear model based on a neighbouring sample set comprising first-colour-component or second-colour-component samples neighbouring respectively the current first-colour-component or second-colour-component block and obtaining the first-colour-component sample using the linear model with the one or more parameters derived and the associated reconstructed second-colour-component sample, wherein deriving the one or more parameters includes obtaining one from a plurality of reference sample sets, including one or more irregular sample sets, to define the neighbouring first-colour-component or second-colour-component sample set for the parameter derivation, at least one irregular sample set comprising only samples from second lines next to respective first lines of outer neighbouring samples parallel and immediately adjacent to respectively the left boundary and the top boundary of the current block.

6. The method of claim 5, wherein the one or more irregular sample sets includes at least one shifted sample set comprising, for the same position along the top or left boundary, at most one from the sample of the first line and the sample of the next and second line.

7. The method of claim 6, wherein the shifted sample set comprises exactly one sample from the sample of the first line and the sample of the next and second line, for each position along the top or left boundary.

8. The method of claim 5, wherein the one or more irregular sample sets includes at least one L-shaped sample set comprising, along the same top or left boundary, the samples of the first and second lines for a first position along the boundary and only one sample from the sample of the first line and the sample of the next and second line for a second and different position along the boundary.

9. The method of claim 5, wherein the one or more irregular sample sets includes at least one square sample set comprising the samples of the first and second lines for each position of a continuous subpart of positions along the top or left boundary and comprising, for the remaining subpart or subparts of positions, no sample from the first and second lines.

10. The method of claim 5, wherein one or more of the irregular sample sets comprises the four samples forming a square continuing, at the top left corner of the current block, the two lines adjacent to the top and left boundaries.

11. The method of claim 5, wherein one or more of the irregular sample sets comprise a different number of samples from the first line and of samples from the next and second line.

12. The method of claim 5, wherein the samples selected along the top boundary for one or more irregular sample sets form a top sample shape that is identical to or mirrored from a left sample shape forming the samples selected along the left boundary.

13. The method of claim 5, wherein one or more of the irregular sample sets are built by selecting some samples from the two lines based on the samples values.

14. A method of obtaining a chroma sample for a current chroma block from an associated reconstructed luma sample of a current luma block in the same frame using a linear model with one or more parameters, the method comprising:

deriving the one or more parameters of the linear model based on a neighbouring chroma sample set comprising chroma samples neighbouring the current chroma block and a neighbouring luma sample set, the neighbouring luma sample set comprises reconstructed luma samples neighbouring the current luma block that are down-sampled to match chroma resolution, obtaining the chroma sample using the linear model with the one or more parameters derived and the associated reconstructed luma samples in the current luma block made of reconstructed luma samples down-sampled to match chroma resolution, obtaining one reference LM mode from a plurality of reference LM modes, each of which being made of one down-sampling scheme and one sample set, to down-sample, using the thus-obtained down-sampling scheme, the reconstructed luma samples to match chroma resolution for the parameter derivation and for the chroma intra predictor generation and to define, using the thus-obtained sample set, the neighbouring luma and chroma sample sets for the parameter derivation, wherein at least one reference LM mode includes an irregular sample set built from two lines of outer neighbouring samples parallel and adjacent to the top boundary of the current block and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

15. The method of claim 14, wherein at least one reference LM mode includes a down-sampling scheme that selects, as down-sampled reconstructed luma sample at a down-sampling position, one reconstructed luma sample in the vicinity of the down-sampling position.

16. The method of claim 15, wherein four of the reference LM modes include four respective down-sampling schemes that select, respectively, top, top right, bottom and bottom right samples of six reconstructed luma samples surrounding the down-sampling position.

17. The method of claim 14, wherein, for each of the top and left boundaries, the two lines are immediately adjacent to the boundary considered.

18. The method of claim 17, wherein the irregular sample set comprises, along the same top or left boundary, samples from the next and second line only.

19. The method of claim 14, further comprising including in a bitstream encoding the current chroma block or retrieving from such bitstream, a single flag identifying the obtained reference LM mode.

20. A device for obtaining a first-colour-component sample for a current first-colour-component block of a multi-colour-component frame from an associated reconstructed second-colour-component sample of a current second-colour-component block in the same frame using a linear model with one or more parameters, the two blocks having the same size, the device comprising at least one microprocessor configured for carrying out the steps of:

deriving the one or more parameters of the linear model based on a neighbouring first-colour-component sample set comprising first-colour-component samples neighbouring the current first-colour-component block and a neighbouring second-colour-component sample set comprising reconstructed second-colour-component samples neighbouring the current second-colour-component block, and obtaining the first-colour-component sample using the linear model with the one or more parameters derived and the associated reconstructed second-colour-component sample in the current second-colour-component block, wherein deriving the one or more parameters includes obtaining one from a plurality of reference sample sets to define the neighbouring first-colour-component and second-colour-component sample sets for the parameter derivation, the plurality of reference sample sets including one or more irregular sample sets, wherein an irregular sample set is built from two lines of outer neighbouring samples parallel and adjacent to the top boundary of the current block and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

21. A device for obtaining a first-colour-component sample for a current first-colour-component block of a multi-colour-component frame from an associated reconstructed second-colour-component sample of a current second-colour-component block in the same frame using a linear model with one or more parameters, the two blocks having the same size, the device comprising at least one microprocessor configured for carrying out the steps of:

deriving the one or more parameters of the linear model based on a neighbouring sample set comprising first-colour-component or second-colour-component samples neighbouring respectively the current first-colour-component or second-colour-component block and obtaining the first-colour-component sample using the linear model with the one or more parameters derived and the associated reconstructed second-colour-component sample, wherein deriving the one or more parameters includes obtaining one from a plurality of reference sample sets, including one or more irregular sample sets, to define the neighbouring first-colour-component or second-colour-component sample set for the parameter derivation, at least one irregular sample set comprising only samples from second lines next to respective first lines of outer neighbouring samples parallel and immediately adjacent to respectively the left boundary and the top boundary of the current block.

22. A device for obtaining a chroma sample for a current chroma block from an associated reconstructed luma sample of a current luma block in the same frame using a linear model with one or more parameters, the device comprising at least one microprocessor configured for carrying out the steps of:

deriving the one or more parameters of the linear model based on a neighbouring chroma sample set comprising chroma samples neighbouring the current chroma block and a neighbouring luma sample set, the neighbouring luma sample set comprises reconstructed luma samples neighbouring the current luma block that are down-sampled to match chroma resolution, obtaining the chroma sample using the linear model with the one or more parameters derived and the associated reconstructed luma samples in the current luma block made of reconstructed luma samples down-sampled to match chroma resolution, obtaining one reference LM mode from a plurality of reference LM modes, each of which being made of one down-sampling scheme and one sample set, to down-sample, using the thus-obtained down-sampling scheme, the reconstructed luma samples to match chroma resolution for the parameter derivation and for the chroma intra predictor generation and to define, using the thus-obtained sample set, the neighbouring luma and chroma sample sets for the parameter derivation wherein at least one reference LM mode includes an irregular sample set built from two lines of outer neighbouring samples parallel and adjacent to the top boundary of the current block and the two lines of outer neighbouring samples parallel and adjacent to the left boundary of the current block, and for at least one position along the top or left boundary of the current block, only one sample is selected from the sample of the first line adjacent to the boundary and the sample of the next and second line, and at least one sample of the next and second line along the same boundary is selected.

23. A non-transitory computer-readable medium storing a program which, when executed by a microprocessor or computer system in a device, causes the device to perform a method according to claim 1.

* * * * *